(12) United States Patent
Planche et al.

(10) Patent No.: US 11,403,491 B2
(45) Date of Patent: Aug. 2, 2022

(54) OBJECT RECOGNITION FROM IMAGES USING CAD MODELS AS PRIOR

(71) Applicant: Siemens Aktiengesellschaft, Munich (DE)

(72) Inventors: Benjamin Planche, Princeton, NJ (US); Sergey Zakharov, Kirchseeon (DE); Ziyan Wu, Princeton, NJ (US); Slobodan Ilic, Munich (DE); Andreas Hutter, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 50 days.

(21) Appl. No.: 17/045,124

(22) PCT Filed: Oct. 29, 2018

(86) PCT No.: PCT/EP2018/079599
§ 371 (c)(1),
(2) Date: Oct. 2, 2020

(87) PCT Pub. No.: WO2019/192744
PCT Pub. Date: Oct. 10, 2019

(65) Prior Publication Data
US 2021/0150274 A1  May 20, 2021

Related U.S. Application Data

(60) Provisional application No. 62/653,720, filed on Apr. 6, 2018.

(51) Int. Cl.
*G06K 9/62* (2022.01)
*G06T 7/194* (2017.01)
(Continued)

(52) U.S. Cl.
CPC .......... *G06K 9/6257* (2013.01); *G06K 9/627* (2013.01); *G06K 9/6262* (2013.01); *G06N 3/04* (2013.01);
(Continued)

(58) Field of Classification Search
CPC combination set(s) only.
See application file for complete search history.

(56) References Cited

U.S. PATENT DOCUMENTS

2008/0246759 A1 10/2008 Summers
2017/0116498 A1* 4/2017 Raveane .............. G06K 9/6257
(Continued)

FOREIGN PATENT DOCUMENTS

JP       6255125 B2    12/2017
KR    20070119018 A    12/2007
(Continued)

OTHER PUBLICATIONS

Jimmy Wu,"Real-Time Object Pose Estimation with Pose Interpreter Networks", Jan. 7, 2019 , 2018 IEEE/RSJ International Conference on Intelligent Robots and Systems (IROS) ,pp. 6798-6802.*
(Continued)

*Primary Examiner* — Omar S Ismail
(74) *Attorney, Agent, or Firm* — Lempia Summerfield Katz LLC

(57) ABSTRACT

The disclosure relates to a method how to recover an object from a cluttered image. The disclosure also relates to a computer program product and a computer-readable storage medium including instructions which, when the program is executed by a computer, cause the computer to carry out the acts of the mentioned method. Further, the disclosure relates to methods how to train components of a recognition system
(Continued)

for recovering an object from such a cluttered image. In addition, the disclosure relates to such a recognition system.

17 Claims, 2 Drawing Sheets

(51) Int. Cl.
  *G06T 7/70* (2017.01)
  *G06N 3/04* (2006.01)
  *G06N 3/08* (2006.01)
  *G06V 10/26* (2022.01)
(52) U.S. Cl.
  CPC .............. *G06N 3/08* (2013.01); *G06T 7/194* (2017.01); *G06T 7/70* (2017.01); *G06V 10/26* (2022.01); *G06T 2207/10024* (2013.01); *G06T 2207/20081* (2013.01); *G06T 2207/20084* (2013.01)

(56) References Cited

U.S. PATENT DOCUMENTS

| | | | |
|---|---|---|---|
| 2019/0080205 A1* | 3/2019 | Kaufhold | G06N 3/0472 |
| 2019/0355150 A1* | 11/2019 | Tremblay | G06T 7/73 |
| 2021/0232926 A1* | 7/2021 | Hutter | G06K 9/6232 |

FOREIGN PATENT DOCUMENTS

| | | | |
|---|---|---|---|
| KR | 20170137350 A | 12/2017 | |
| WO | 2011115143 A1 | 9/2011 | |
| WO | 2012147027 A1 | 11/2012 | |
| WO | WO-2019057402 A1 * | 3/2019 | .............. G06F 17/11 |

OTHER PUBLICATIONS

Aayush Bansal, "Marr Revisited: 2D-3D Alignment via Surface Normal Prediction", Jun. 2016, Proceedings of the IEEE Conference on Computer Vision and Pattern Recognition (CVPR), 2016,pp. 5965-5972.*
Yu Xiang,"PoseCNN: A Convolutional Neural Network for 6D Object Pose Estimation in Cluttered Scenes," May 26, 2018, Computer Vision and Pattern Recognition (cs.CV); Robotics (cs.RO), pp. 1-7.*
Andy Zeng,"Robotic Pick-and-Place of Novel Objects in Clutter with Multi-Affordance Grasping and Cross-Domain Image Matching,"May 21-25, 2018,2018 IEEE International Conference on Robotics and Automation (ICRA),pp. 3750-3756.*
Haoruo Zhang,"Texture-less object detection and 6D pose estimation in RGB-D images,"Jun. 19, 2017, Robotics and Autonomous Systems 95 (2017) 64-79,pp. 66-74.*
Bloice, Marcus D., Christof Stocker, and Andreas Holzinger. "Augmentor: an image augmentation library for machine learning." arXiv preprint arXiv:1708.04680 (2017). 1-5.
Bousmalis, Konstantinos, et al. "Unsupervised pixel-level domain adaptation with generative adversarial networks." Proceedings of the IEEE conference on computer vision and pattern recognition. 2017. 3722-3731.
Hinterstoisser, Stefan, et al. "Technical demonstration on model based training, detection and pose estimation of texture-less 3D objects in heavily cluttered scenes." European Conference on Computer Vision. Springer, Berlin, Heidelberg, 2012. 593-596.
International Preliminary Report on Patentability for International Patent Application PCT/EP2018/079599 dated Mar. 19, 2020.
International Search Report and the Written Opinion for International Patent Application PCT/EP2018/079599 dated Feb. 13, 2019.
Mustafa, Adnan AY, Linda G. Shapiro, and Mark A. Ganter. "3D object recognition from color intensity images." Proceedings of 13th International Conference on Pattern Recognition. vol. 1. IEEE, 1996. 627-631.

* cited by examiner

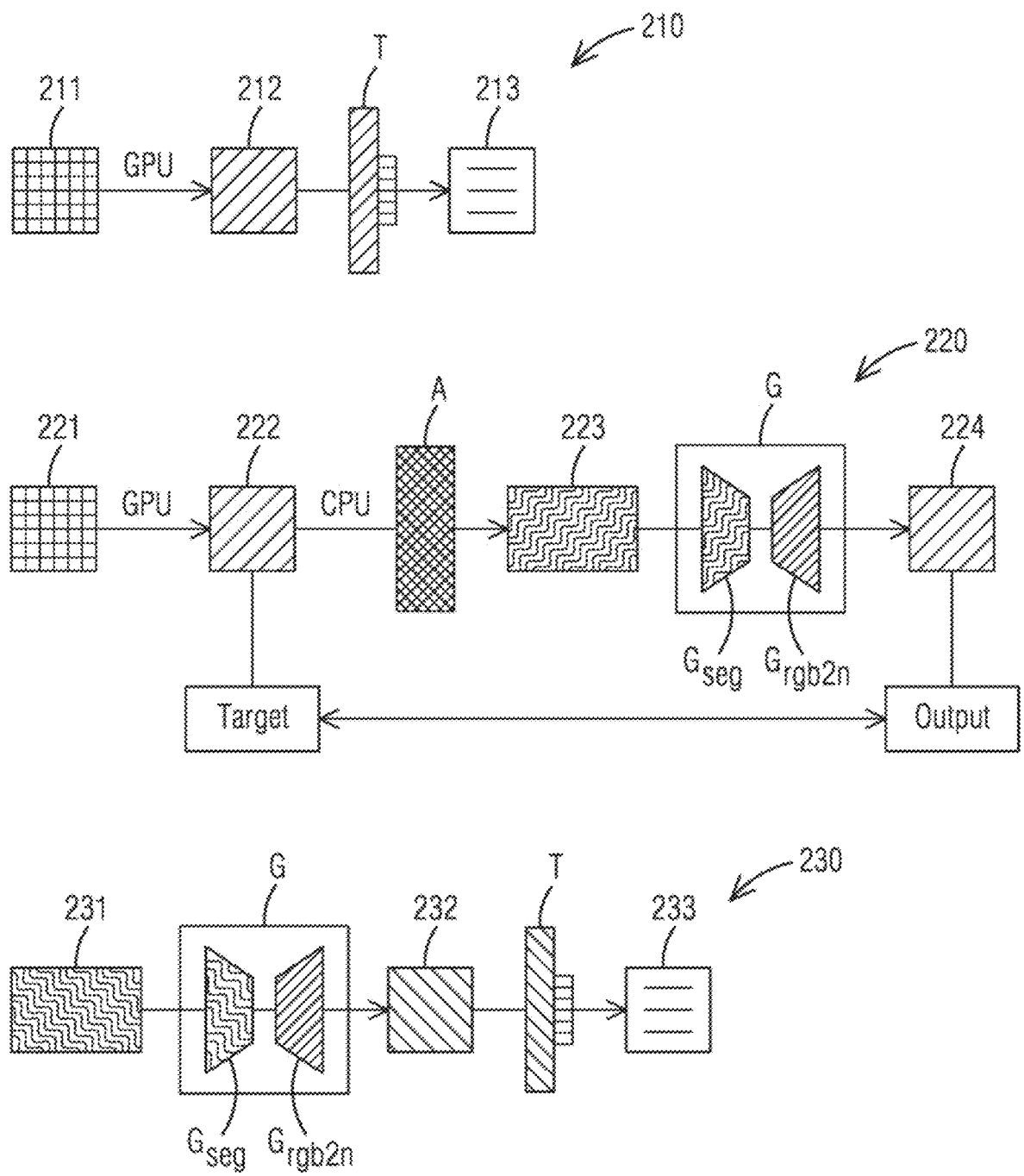

OBJECT RECOGNITION FROM IMAGES USING CAD MODELS AS PRIOR

The present patent document is a § 371 nationalization of PCT Application Serial No. PCT/EP2018/079599, filed Oct. 29, 2018, designating the United States, which is hereby incorporated by reference, and this patent document also claims the benefit of U.S. Provisional Patent Application No. 62/653,720, filed Apr. 6, 2018, which is also hereby incorporated by reference.

TECHNICAL FIELD

The disclosure relates to a method how to recover an object from a cluttered image. The disclosure also relates to a computer program product and a computer-readable storage medium including instructions which, when the program is executed by a computer, cause the computer to carry out the acts of the mentioned method. Further, the disclosure relates to methods how to train components of a recognition system for recovering an object from such a cluttered image. In addition, the disclosure relates to such a recognition system.

BACKGROUND

A reliable machine-based recognition of an object from an image, as obtained e.g. from a photo or video camera, is a challenging task. Known recognition systems may include detection devices or components, such as a camera, and a computer-implemented method by which the nature (in other words, the class or category) of the object or the pose of the object may be recognized. The recognition system shall, for instance, be able to recognize whether, e.g., a cat, a car, or a cactus is depicted on the image and/or how the pose of the object is relative to the camera.

As a concrete example, the recognition system receives a color image as input. One object (e.g., a cat) of a predetermined set of objects (e.g., cat, car, and cactus) is depicted in the input image. The object is depicted in a cluttered way, e.g., it is depicted before a specific background, at specific lightning conditions, partially occluded, noisy, etc. The task for the recognition system is to tell which one of the predetermined objects is actually depicted in the input image (here, the cat).

Another exemplary task for the recognition system would be to evaluate whether the cat is shown from the front, the back, or from the side. Yet another exemplary task would be to determine how many cats are actually depicted in the image, even if they partially mask, (e.g., occlude), each other.

As the recognition system shall in real life be capable to autonomously recover the object from an unseen cluttered image, it needs to be trained beforehand.

A traditional approach to train the recognition system is to train it with a large number of real, cluttered images depicting cats with, for instance, different appearances and before different backgrounds. This means that a large number of labelled images of cats (e.g., and cars and cactus) need to be provided in order to train the recognition system.

Apart from the fact that the provision of a large number of real, labelled training images is a time-consuming and tedious task, which may even be impossible in certain circumstances. For instance, in industrial applications where components of a machine need to be identified by the recognition system, it would be not acceptable to build up a number of training images of the component of the machine, in particular if the machine is a unique, because customized exemplar.

To solve the problem of lacking real training data, it has been proposed to train the recognition system purely on synthetic images. In contrast to real images, a synthetic image is obtained by simulation based on certain input data. Input data which at least in industrial applications is widely available are computer-aided design (CAD) models of the components of the machine which shall be recognized.

CAD models may only have purely semantic and geometrical information, e.g., they do not contain any visual information. In other words, CAD models as such are assumed to be texture-less. Texture information as well as lighting and shading information would only be contained in an image after a rendering process, which is understood as the process of generating an image (or "scene") containing the geometry, viewpoint, texture, lightning, and shading information based on a 2D or 3D model.

The present disclosure focuses on texture-less CAD models as input data, e.g., as priors, for the generation of training data. It is known to generate color images from texture-less CAD models. These color images may be used as training images for the recognition system. The training images, (which are cluttered color images including the object to be recognized before a background and including lighting, shading, textures, noise, occlusions, etc.), may be obtained by conventional techniques using a graphics processing unit (GPU). The recognition system subsequently uses the synthetically generated cluttered color images as input images during its training phase. Hence, the recognition system has the task to identify the desired feature of the object (e.g., class or pose) from the synthetic cluttered color image. This training is deemed to be a supervised training, as the results of the recognition system (e.g., the statement that a cactus and not a car is depicted in the cluttered image) are compared with the true result, which is known, as it represents the input CAD model which has been used to generate the cluttered image. After many iteration acts, which are carried out during the training phase, the recognition system gets more and more accurate in determining the required features of the object being depicted in the synthetic cluttered image.

After the recognition system is trained, the recognition system may be used for identifying the nature and/or features in unseen, real cluttered images. The object to be recognized in the image may be an object which the recognition system has been trained for during the training phase. Depending on the training level of the recognition system, the recognition system may thus be used to more or less accurately determine the desired features on unseen, real cluttered color images.

A severe and well-known problem for computer vision methods that rely on synthetic data is the so-called realism gap, as the knowledge acquired on these modalities may poorly translate to the more complex real domain, resulting in a dramatic accuracy drop. Several ways to tackle this issue have been investigated so far.

A first obvious solution is to improve the quality and realism of the synthetic models. Several works try to push forward simulation tools for sensing devices and environmental phenomena. State-of-the-art depth sensor simulators work fairly well for instance, as the mechanisms impairing depth scans have been well studied and may be rather well reproduced. In case of color data however, the problem lies not in the sensor simulation but in the actual complexity and variability of the color domain (e.g., sensibility to lighting conditions, texture changes with wear-and-tear, etc.). This makes it extremely arduous to come up with a satisfactory mapping, unless precise, exhaustive synthetic models are provided (e.g., by capturing realistic textures). Proper modeling of target classes is however may not be enough, as recognition methods would also need information on their environment (e.g., background, occlusions, etc.) to be applied to real-life scenarios.

For this reason, and in complement of simulation tools, recent methods based on convolutional neural networks (CNN) are trying to further bridge the realism gap by learning a mapping from rendered to real data, directly in the image domain. Mostly based on unsupervised conditional generative adversarial networks (GANs) (such as Bousmalis et al.: "Unsupervised Pixel—Level Domain Adaption with Generative Adversarial Networks", arXiv:1612.05424) or style-transfer solutions, these methods still need a set of real samples to learn their mapping.

There are circumstances, however, where the provision of real samples is impossible or only possible with considerable efforts.

SUMMARY AND DESCRIPTION

The scope of the present disclosure is defined solely by the appended claims and is not affected to any degree by the statements within this summary. The present embodiments may obviate one or more of the drawbacks or limitations in the related art.

It is thus an object of the present disclosure to provide a recognition system given the constraint that the only input available are texture-less CAD models.

This object is achieved by the concept disclosed in the independent claims. Advantageous embodiments and variations are described in the dependent claims and the drawings accompanying the description.

According to one aspect, there is provided a method to recover an object from a cluttered image by artificial neural networks. The method includes the following acts: generating a normal map from the cluttered image by a trained image generator; recovering the object from the normal map by a trained task-specific recognition unit; and outputting the results to an output unit.

Herein, the image generator has been trained by an artificial neural network and the recognition unit is trained by an artificial neural network.

As disclosed herein, "recovering" an object includes recognizing (e.g., determining) the class instance of the object, its pose relative to the camera, or other properties of the object.

"Artificial neural networks" (ANN) are computing systems vaguely inspired by the biological neural networks that constitute animal brains. Artificial neural networks "learn" to perform tasks by considering examples, e.g., without being programmed with any task-specific rules.

An ANN is based on a collection of connected units or nodes called artificial neurons which loosely model the neurons in a biological brain. Each connection, like the synapses in a biological brain, may transmit a signal from one artificial neuron to another. An artificial neuron that receives a signal may process it and then signal additional artificial neurons connected to it.

In common ANN implementations, the signal at a connection between artificial neurons is a real number, and the output of each artificial neuron is computed by some non-linear function of the sum of its inputs. The connections between artificial neurons are called 'edges'. Artificial neurons and edges may have a weight that adjusts as learning proceeds. The weight increases or decreases the strength of the signal at a connection. Artificial neurons may be aggregated into layers. Different layers may perform different kinds of transformations on their inputs. Signals travel from the first layer (e.g., the input layer) to the last layer (e.g., the output layer), e.g., passing through a multitude of hidden layers in-between.

According to another aspect, a task-specific recognition unit which is designed for recovering an object from a synthetic normal map includes an artificial neural network and is trained according to a method with the following acts: receiving synthetic normal maps as input, wherein the synthetic normal maps are obtained from a texture-less CAD model; recovering the object as output; comparing the output of the recognition unit with the respective property of the object as represented in the normal map; and optimizing the neural network of the recognition unit such that the deviation between its output and the respective property of the input is minimum.

Yet another aspect relates to the training of an image generator which is designed for converting cluttered images into normal maps. The training is ANN-based as well, as the image generator also includes an artificial neural network. The training method includes the following acts: receiving synthetic cluttered images as input, wherein the cluttered images are the output of an augmentation pipeline which augments synthetic normal maps into synthetic cluttered images; giving a normal map as output; comparing the output of the image generator with the respective normal map given as input to the augmentation pipeline; and optimizing the neural network of the image generator such that the deviation between its output and the normal map given as input to the augmentation pipeline is minimum.

The method to recover an object from a cluttered image advantageously uses an image generator which has been trained according to the training method described above and uses a task-specific recognition unit which has been trained according to the training method described above.

As a result, a recognition system is provided which is able to accurately identify an object from a predetermined set of objects, for which only CAD models as priors exist. As a consequence, neither labelled nor un-labelled real-life color images are, e.g., necessary for training the recognition system.

One important aspect is that the claimed method does not target to build realistic images from the texture-less CAD models for the training of the task-specific recognition unit. Instead, the recognition unit is purely trained on synthetic data, (e.g., synthetic normal maps), which are directly obtained from the CAD models. Also the image generator, which during the real-life use phase is needed to convert the real cluttered images into real normal maps is trained purely on synthetic data.

Another aspect is that a normal map is created from the texture-less input CAD model during the training of the recognition unit. The creation of normal maps instead of images, (e.g., color images), has the enormous advantage that this may be carried out by the central processor unit (CPU) of the recognition system instead of the GPU. The consequence is that the created normal maps do not need to be stored separately, but may be used directly by the recognition unit. Therefore, the generation and processing of the normal maps from the CAD models may be referred to as an "online" process, while the conventional process of generating and processing images from CAD models may be referred to as an "offline" process.

A normal map is a representation of the surface normals of a 3D model from a particular viewpoint, stored in a two-dimensional colored image, also referred to as an RGB (i.e., red color/green color/blue color) image. Herein each color corresponds to the orientation of the surface normal. Note that the synthetic normal maps which are used for training the recognition unit are noiseless, e.g., they do not contain any clutter in contrast to the input training images which are used to train the recognition unit in some prior art concepts.

3D engines are able to automatically render realistic images from 3D models (cf. movie/video-game industry). But for that, they need detailed 3D models, with realistic texture/color information. Most industrial CAD models do not have such details as these models are mostly used for engineering/production tasks, not for visualization. A way to add this information to CAD models would be, for instance, to build a library of realistic textures, or to take pictures of the produced objects to extract the information. But having operators to do so for every new client, object, part, etc. would be costly and/or not scalable.

The normal maps given as output of the image generator are compared with regard to the normal maps given as input to the augmentation pipeline. In other words, the weights of the artificial neurons and edges are adjusted by the artificial neural network autonomously, aiming at minimizing the deviation between the output normal map and the input normal map (e.g., target normal map) of the image generator. Which one of the numerous weights of the ANN is adjusted is determined by the ANN autonomously and may not be disclosed (e.g., may be hidden) for the user.

In an advantageous embodiment, the image generator is composed of two units: a segmentation unit ($G_{seg}$) for extracting the foregrounds out of the cluttered images, thus obtaining segmented images; and a color-to-normal unit ($G_{rgb2n}$) for converting the segmented images into normal maps.

Descriptively speaking, the segmentation unit determines the contour of the object of interest in the cluttered image and creates a binary mask of the object while the color-to-normal unit converts the superposition of the cluttered image and its binary mask into a normal map.

The segmentation unit may be trained alone for optimally extracting the foreground out of the cluttered image or it may be optimized together with the color-to-normal unit.

In addition to the two mentioned components of the image generator, (each component including its own artificial neural network), the image generator may further include a refinement unit which refines the normal map obtained by the image generator. The refinement unit advantageously also includes an artificial neural network, in particular, a generative adversarial network.

BRIEF DESCRIPTION OF THE DRAWINGS

Embodiments of the disclosure are now described, by way of example only, with the help of the accompanying drawings, of which:

FIG. 2 depicts a recognition system according to an embodiment.

DETAILED DESCRIPTION

Figure 1:
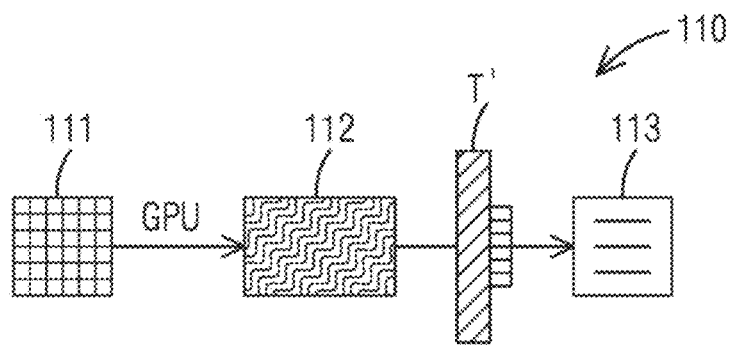
FIG. 1 depicts a recognition system according to the prior art.
Figure 1:
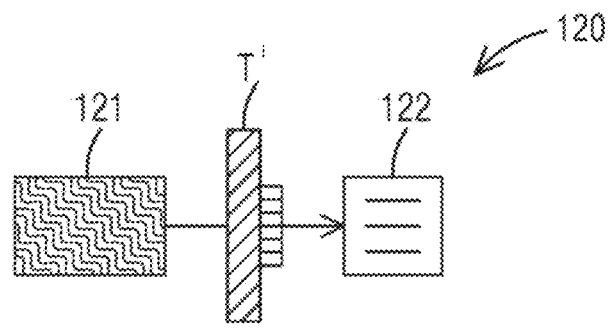

FIG. 1 illustrates a method for recognizing an object from an image according to the prior art. In a first phase, a recognition system T' is trained. Therefore, this phase is referred to as the training phase 110. After the training has finished, in a second phase, the trained recognition system T' is used for recognizing an object from a cluttered image (121), which is unknown to the recognition system and which is a real, cluttered image. Therefore, the second phase is referred to as the use phase 120.

During the training phase 110, synthetic cluttered images 112 are fed into the recognition system T'. The cluttered images 112 are obtained from texture-less CAD models 111. The creation of the cluttered images 112 based on the CAD model 111 is carried out by a graphics processor unit (GPU), a processor which is designed for creating graphics, (e.g., images), purely from CAD model data. The images are stored at a memory space of the recognition system.

Note that the cluttered image 112 does not only display the object of the CAD model 111 as such. A texture and a color may be given to the object; shading due to a simulated lighting of the object may be considered; the object may be partly occluded; there may be displayed other objects in the same image; the entire image contains noise; and the image may contain a background. Therefore, the image is referred to as a cluttered image 112. The cluttering may be chosen fully randomly; certain constraints, e.g. for the occlusions or the noise, are, however, possible.

For every object which shall be accurately recognized by the recognition unit in the use phase, a significant number of cluttered images are simulated by the GPU. The perspective, from which the object is seen, is identical for each simulated image in the first place; however, the "clutter", e.g., the background, lighting, noise, etc. is different for every image.

In addition, the perspective from which the object is seen is changed. A hemisphere around and above the CAD model of the object is virtually created and a desired number of viewpoints are defined. For each viewpoint, e.g., for each perspective, a significant number of cluttered images are simulated by the GPU, as described above. By this procedure, a large number of images depicting the same object from different viewpoints with different "clutter" is obtained.

The recognition unit T' analyzes the synthetic cluttered images 112, wherein a specific task is set to the recognition unit. For instance, the task may be to recognize the nature, (e.g., the class or category), of the object, such as whether the object being depicted in the cluttered image is a cow, a cat, or a cactus. In this case, the recognition unit needs to be trained with the CAD models of all mentioned objects (here, cow, cat, and cactus). Another task for the recognition unit may be to identify the pose of the object, namely whether the object is depicted in a top view, from the front, the back, or from one of the side (in case that the object has well-defined front, back, top, and bottom sides). As the algorithm of the recognition unit depends on the task that the recognition unit is expected to solve during the use phase, the recognition unit is also referred to as the task-specific recognition unit T'.

Note that a drawback of the described prior art concept is that every generated image needs to be stored at a memory space of the recognition system. After being stored in the system, it may immediately be fed into the recognition unit. Alternatively, this may be done after all images have been created.

Another, more important drawback of known methods which mainly rely on synthetic data to train the recognition system is the realism gap. Because the actual textures of the target objects are unknown, realistic synthetic images may not be rendered as key elements of their visual appearance are missing. The features the model learned for the synthetic domain thus may poorly work on the domain of real images. While previous works focus on adapting the model so the features it learns from the synthetic domain may be applied to the real one, the method disclosed herein performs differently. Letting the model deal purely with synthetic data, this model is trained in parallel by another function, namely by a set of generative neural networks to project real images into the clean synthetic domain.

Coming back to the prior art, the recognition unit T' is trained in a supervised manner. It has to make its decision regarding the task given to it and transmit or display its output 113, e.g. the class or the pose of the object. As the recognition system inherently knows the solution to the task, the output 113 may be evaluated automatically. Thus, the evaluation of the accuracy of the recognition system may be carried out by the recognition system itself.

After the recognition unit T' is trained to a sufficient degree, the use phase 120 may commence. Herein, images 121, which are unknown to the recognition system T', are given as an input to the recognition unit T'. The images are cluttered, and the images are real instead of synthetic. However, due to the training phase 110 of the recognition unit T', a reasonable accuracy of the recognition unit T' may be achieved.

Still, the already mentioned drawbacks persist, e.g., a finite number of training data that need to be stored at a storage site separately, and an accuracy which is not optimum.

FIG. 2 illustrates an exemplary embodiment of the concept. In a first phase, the training phase 210, a task-specific recognition unit T is trained for solving a specific task, e.g., recognizing the class or the pose of an object. In a second phase, the training phase 220, an image generator G is trained for generating normal maps 224 which best possibly represent the normal map 222 of a given CAD model 221. In a third phase, the use phase 230, an unseen, real cluttered image 231 is evaluated by the trained recognition unit T with the help of the trained image generator G. As a result, an output 233 is issued representing the solution of the task given to the recognition unit T, e.g., to recognize and identify the nature and/or a specific feature of the object displayed in the real cluttered input image 231.

One of the key differences of the present disclosure compared to the prior art as illustrated in FIG. 1 is the creation of a normal map 212 from the texture-less input CAD model 211 in contrast to a cluttered image 112 during the training phase 210 of the recognition unit T, T', respectively. The creation of normal maps 212 instead of images 112 has the enormous advantage that this may be carried out by the central processor unit (CPU) of the recognition system instead of the GPU. The consequence is that the created normal maps 212 do not need to be stored separately, but may be used directly by the recognition unit T. Therefore, the generation and processing of the normal maps 212 from the CAD models 211 may be referred to as an "online" process, while the conventional process of generating and processing images 112 from CAD models 111 may be referred to as an "offline" process.

Again, the recognition unit T is trained for a specific task. Exemplary tasks are the identification of the class or the pose of the object being depicted in the normal map 212. The recognition unit T gives as output 213 the corresponding solution to the given task.

The training of the recognition unit T is performed in a supervised manner. As the recognition system "knows" the solution of the task, e.g., as it knows the class or pose of the object, which is transformed into the normal map 212 and subsequently fed into the recognition unit T, it may correct or confirm the output 213 of the recognition unit T. Thus, the recognition unit T learns by itself and without human interaction.

It is worth to mention that the recognition unit T may in principle be trained by an unlimited number of training data. As the training occurs "on the fly", in other words "online", no library of training images need to be built up, in contrast to the prior art method explained above where this is mandatory. Therefore, the training of the recognition unit T is sometimes referred to as being carried out on an "infinite" number of training data.

Note that, in contrast to what may be imagined intuitively, it is not targeted to generate an image as realistic as possible from the texture-less input CAD model. Moreover, the recognition unit shall, figuratively speaking, become "texture-blind", which means that the object shall be recognized in the cluttered image irrespective of the background, the shading, eventual occlusion, etc.

Further note, that, in addition, the perspective from which the object is seen is changed. A hemisphere around and above the CAD model of the object is virtually created and a desired number of viewpoints are defined. For each viewpoint, (e.g., for each perspective), a significant number of cluttered images are simulated by the CPU. By this procedure, a large number of images depicting the same object from different viewpoints with different "clutter" is obtained.

In addition to the training of the recognition unit (e.g., first training phase 210), a second training phase 220 is provided in the concept, too. During the second training phase 220, an image generator G is trained by generative adversarial networks (GAN). The image generator G needs the training in order to generate high-quality normal maps 224 from cluttered images 223.

In a first act, a texture-less CAD model 221 is transformed into a synthetic, noiseless normal map 222, like during the training phase 210 for the recognition unit. The generation of the normal maps 222 is carried out online by the CPU.

Subsequently, the synthetic normal maps 222 are converted into synthetic cluttered images 223 via an augmentation pipeline A. The augmentation pipeline augments the received normal map by adding texture, noise, partial occlusions, etc. and at the same time converting the normal maps into color images. An example of an augmentation pipeline is given in Marcus D. Bloice, Christof Stocker, and Andreas Holzinger: "Augmentor: An Image Augmentation Library for Machine Learning", arXiv:1708.04680v1.

After the transformation of the normal map 222 into the cluttered image 223, the cluttered image 223 is subsequently transformed back into a normal map 224. The challenge here is not only to execute this transformation, but, above all, to generate a clean, (e.g., noiseless), normal map from the cluttered, (e.g., noisy), image. This task is accomplished by the image generator G.

The image generator G includes a segmentation unit $G_{seg}$ and a color-to-normal unit $G_{rgb2n}$. The segmentation unit $G_{seg}$ has the task to extract the foregrounds out of the cluttered images 223. The foreground is sometimes also referred to as the "target object". In other words, the task of the segmentation unit $G_{seg}$ is to recognize and identify the contour of the object to be analyzed and "cut" it out from the background. In practice, a first convolutional neural network (CNN) is favorably used to accomplish this task.

Subsequently, a generative adversarial networks (GAN) is used for the color-to-normal unit $G_{rgb2n}$ to convert the segmented color images (e.g., target objects) into normal maps 224.

$G_{seg}$ is trained to convert the cluttered images 223 into a binary mask of their foreground, using a generative loss.

$G_{rgb2n}$ takes for input the cluttered images and their respective masks from $G_{seg}$, using the two to output noiseless geometrical maps. As a GAN, it has several losses to guide its training for this complex task.

For one, certain losses include normal and foreground generative losses, between its outputs and the expected geometrical maps. A normal generative loss computes the distance between two images (e.g., between the original normal map and the generated one), comparing their pixel values. A foreground generative loss computes a similar distance but ignoring the pixels which don't belong to the foreground object (e.g., using a binary mask).

An additional loss is a discriminator loss computed by an auxiliary/adversarial network. This network is trained along the image generator G to recognize the "fake" maps from G from the original ones. The discriminative loss expresses the ability of G to trick auxiliary/adversarial network.

Further, another loss is an optional task-specific loss. In the case that the target recognition method is already available and ready-to-use when training this GAN, it may be used on the generated normal maps, as well as on the original ones. The task-specific loss is then the distance between the estimations (e.g., recovered information) of the recognition method on the original data, and on the generated ones. In other words, it guides the GAN to generate normal maps which would induce the same responses from the recognition methods as the original clean normal maps. This formulation has two advantages: no assumptions are made regarding the nature of the recovered information, and no ground-truth is needed since this loss only depends on the difference between the two estimations made by the recognition method.

Each act may be first trained consecutively (e.g., firstly, training of $G_{seg}$, then training of $G_{rgb2n}$ while fixing $G_{seg}$), then conjointly (training end-to-end).

As an option (not illustrated in FIG. 2), another CNN, namely $G_{ref}$, may be used to refine the output of the first CNN $G_{seg}$. $G_{ref}$ takes for input the synthetic cluttered images and their respective outputs from $G_{rgb2n}$, using the two modalities to refine the geometrical estimation. It is trained using a generative loss comparing its outputs to the expected maps.

The training of $G_{ref}$ would advantageously be carried out while fixing $G_{seg}$ and $G_{rgb2n}$.

After both the recognition unit T and the image generator G are trained, the recognition system T may be used in "real life". During the use phase 230, an unseen, real cluttered image 231 of an object is first given to the image generator G. The image generator G extracts a clean normal map 232 from the cluttered image 231 by extracting the foreground and converting the segmented image into a normal map 232. Segmentation is performed by the segmentation unit $G_{seg}$. Conversion into the normal map is performed by the color-to-normal unit $G_{rgb2n}$.

The resulting clean normal map 232 is then fed as input into the task-specific recognition system T, which gives the required output 233, e.g., the class and/or the pose of the object.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method to recover an object from a cluttered image by artificial neural networks, the method comprising:
   generating a normal map from the cluttered image by a trained image generator;
   recovering the object from the normal map by a trained task-specific recognition unit; and
   outputting the result to an output unit,
   wherein both the image generator and the recognition unit have been trained by an artificial neural network,
   wherein the training of the image generator comprises:
      receiving synthetic cluttered images as input, wherein the cluttered images are the output of an augmentation pipeline which augments synthetic normal maps into synthetic cluttered images;
      giving a normal map as output;
      comparing the output of the image generator with the respective normal map given as input to the augmentation pipeline;
      optimizing the neural network of the image generator such that a deviation between the output and the normal map given as input to the augmentation pipeline is minimum, and
   wherein the training of the recognition unit comprises:
      receiving synthetic normal maps as input, wherein the synthetic normal maps are obtained from a textureless CAD model;
      recognizing the object as output;
      comparing the output of the recognition unit with the respective property of the object as represented in the normal map; and
      optimizing the neural network of the recognition unit such that a deviation between the output and the respective property of the input is minimum.

2. The method of claim 1, wherein recognizing the object comprises identifying a class of the object.

3. The method of claim 1, wherein recognizing the object comprises evaluating the pose of the object.

4. The method of claim 1, wherein recognizing the object comprises evaluating an occupancy map of the cluttered image.

5. The method of claim 1, wherein the cluttered image used as input for the method is a color image.

6. The method of claim 1, further comprising:
   extracting, by a segmentation unit of the image generator, foregrounds out of the cluttered images, thus obtaining segmented images; and
   converting, by a color-to-normal unit of the image generator, the segmented images into normal maps.

7. The method of claim 6, wherein the segmentation unit comprises a convolutional neural network.

8. The method of claim 6, wherein the color-to-normal unit comprises a generative adversarial network.

9. The method of claim 6, further comprising:
refining, by a refinement unit of the image generator, the normal map obtained by the image generator, and
wherein the refinement unit comprises a generative adversarial network.

10. A recognition system for recognizing an object from a cluttered image by artificial neural networks, the recognition system comprising:
a trained image generator for generating a normal map from the cluttered image;
a trained task-specific recognition unit for recovering the object from the normal map; and
an output unit for outputting the result,
wherein both the image generator and the recognition unit comprise an artificial neural network,
wherein the artificial neural network of the image generator is configured to be trained by:
receiving synthetic cluttered images as input, wherein the cluttered images are the output of an augmentation pipeline which augments synthetic normal maps into synthetic cluttered images;
giving a normal map as output;
comparing the output of the image generator with the respective normal map given as input to the augmentation pipeline;
optimizing the neural network of the image generator such that a deviation between the output and the normal map given as input to the augmentation pipeline is minimum, and
wherein the artificial neural network of the recognition unit is configured to be trained by:
receiving synthetic normal maps as input, wherein the synthetic normal maps are obtained from a textureless CAD model;
recognizing the object as output;
comparing the output of the recognition unit with the respective property of the object as represented in the normal map; and
optimizing the neural network of the recognition unit such that a deviation between the output and the respective property of the input is minimum.

11. A non-transitory computer-readable storage medium comprising instructions which, when executed by a computer, cause the computer to:
generate a normal map from the cluttered image by a trained image generator;
recover the object from the normal map by a trained task-specific recognition unit; and
output the result to an output unit,
wherein both the image generator and the recognition unit have been trained by an artificial neural network,
wherein the training of the image generator comprises:
receiving synthetic cluttered images as input, wherein the cluttered images are the output of an augmentation pipeline which augments synthetic normal maps into synthetic cluttered images;
giving a normal map as output;
comparing the output of the image generator with the respective normal map given as input to the augmentation pipeline;
optimizing the neural network of the image generator such that the deviation between the output and the normal map given as input to the augmentation pipeline is minimum, and
wherein the training of the recognition unit comprises:
receiving synthetic normal maps as input, wherein the synthetic normal maps are obtained from a textureless CAD model;
recognizing the object as output;
comparing the output of the recognition unit with the respective property of the object as represented in the normal map; and
optimizing the neural network of the recognition unit such that the deviation between the output and the respective property of the input is minimum.

12. The recognition system of claim 10, wherein the trained image generator comprises:
a segmentation unit for extracting foregrounds out of the cluttered images to provide segmented images; and
a color-to-normal unit for converting the segmented images into normal maps.

13. The recognition system of claim 12, wherein the segmentation unit comprises a convolutional neural network.

14. The recognition system of claim 13, wherein the color-to-normal unit comprises a generative adversarial network.

15. The recognition system of claim 12, wherein the color-to-normal unit comprises a generative adversarial network.

16. The recognition system of claim 12, wherein the trained image generator further comprises:
a refinement unit configured to refine the normal map obtained by the trained image generator.

17. The recognition system of claim 16, wherein the refinement unit comprises a generative adversarial network.

* * * * *

UNITED STATES PATENT AND TRADEMARK OFFICE
CERTIFICATE OF CORRECTION

| | |
|---|---|
| PATENT NO. | : 11,403,491 B2 |
| APPLICATION NO. | : 17/045124 |
| DATED | : August 2, 2022 |
| INVENTOR(S) | : Benjamin Planche et al. |

It is certified that error appears in the above-identified patent and that said Letters Patent is hereby corrected as shown below:

In the Claims (Claim 1; Column 10; Line 24):
"outputting the result to an output unit,"
Should be replaced with:
"outputting a result to an output unit,"

(Claim 1; Column 10; Line 31):
"into synthetic cluttered images;"
Should be replaced with:
"into the synthetic cluttered images;"

(Claim 3; Column 10; Line 54):
"comprises evaluating the pose of the object."
Should be replaced with:
"comprises evaluating a pose of the object."

(Claim 10; Column 11; Line 15):
"an output unit for outputting the result,"
Should be replaced with:
"an output unit for outputting a result,"

(Claim 10; Column 11; Line 23):
"into synthetic cluttered images;"
Should be replaced with:
"into the synthetic cluttered images;"

(Claim 11; Column 11; Line 47):
"generate a normal map from the cluttered image by a"

Signed and Sealed this
Twenty-second Day of November, 2022

Katherine Kelly Vidal
*Director of the United States Patent and Trademark Office*

CERTIFICATE OF CORRECTION (continued)
U.S. Pat. No. 11,403,491 B2

Should be replaced with:
"generate a normal map from a cluttered image by a"

(Claim 11; Column 11; Line 49):
"recover the object from the normal map by a trained"
Should be replaced with:
"recover an object from the normal map by a trained"

(Claim 11; Column 11; Line 51):
"output the result to an output unit,"
Should be replaced with:
"output a result to an output unit,"

(Claim 11; Column 12; Line 7):
"into synthetic cluttered images;"
Should be replaced with:
"into the synthetic cluttered images;"

(Claim 11; Column 12; Line 13):
"such that the deviation between the output and the"
Should be replaced with:
"such that a deviation between the output and the"

(Claim 11; Column 12; Line 26):
"such that the deviation between the output and the"
Should be replaced with:
"such that a deviation between the output and the"